United States Patent [19]

Udo

[11] Patent Number: 4,965,813
[45] Date of Patent: Oct. 23, 1990

[54] COMBUSTION AIDING APPARATUS FOR STEEL-MAKING ELECTRIC-ARC-FURNACE

[75] Inventor: Eiji Udo, Kobe, Japan

[73] Assignee: Nikko Industry Co., Ltd., Kobe, Japan

[21] Appl. No.: 408,336

[22] Filed: Sep. 18, 1989

[30] Foreign Application Priority Data

Jul. 25, 1989 [JP] Japan .................................. 1-193237

[51] Int. Cl.$^5$ ......................... H05B 7/00; H05B 11/00
[52] U.S. Cl. ........................................... 373/2; 373/84
[58] Field of Search .............................. 373/2, 72, 84

[56] References Cited

U.S. PATENT DOCUMENTS 4,679,205 7/1987 Heidenreich et al. ................ 373/84
4,730,336 3/1988 Herneisen et al. ..................... 373/2

Primary Examiner—Roy N. Envall, Jr.
Attorney, Agent, or Firm—Edwin E. Greigg

[57] ABSTRACT

A combustion aiding apparatus for a steel-making electric-arc-furnace characterized by installing a combustion aiding burner on a balcony having an inspection-and-working opening through which to drop tapping hole filling-agent and also by making the nozzle of said combustion aiding burner freely inserted into and withdrawn from a furnace through the inspection-and-working opening, in a conventional combustion aiding apparatus for a steel-making electric-arc-furnace of eccentric bottom tapping type.

3 Claims, 3 Drawing Sheets

COMBUSTION AIDING APPARATUS FOR STEEL-MAKING ELECTRIC-ARC-FURNACE

FIELD OF THE INVENTION AND PRIOR ART STATEMENT

1. FIELD OF THE INVENTION

This invention relates to a combustion aiding apparatus for a steel-making electric-arc-furnace (EAF) of eccentric bottom tapping type (EBT).

2. DESCRIPTION OF THE PRIOR ART

In recent years, a steel-making EAF has been shifting from a furnace tilting steel-discharging type to an EBT type. In here, the conventional EBT type will be described in accordance with FIG. 4 and FIG. 5. FIG. 4 is a longitudinal sectional view showing the generic configuration of a steel-making EAF of EBT type. FIG. 5 is a schematic horizontal sectional view of a steel-making EAF of EBT type. In both figures, 1 is a furnace bed, 2 is a furnace side wall, 3 is a furnace top cover, and 4 are electrodes. In the furnace of this EBT type, a portion of said furnace bed 1 juts out in one direction. And, in this jut portion 1a, a tapping hole 5 is provided. Also, a balcony 6 shoots out from said furnace side wall 2 in correspondence to said jut portion 1a, on which balcony and just above said tapping hole 5, an inspection-and-working opening 7 and its lid 8 are provided.

For making steel using said type of EAF and utilizing steel scraps as a steel source; at first, the steel scraps are put into the furnace, electric arc and heat are produced between said electrodes 4 and the steel scraps, and the steel scraps are melted by the heat; secondly, steel discharging is carried out through said tapping hole 5; thirdly, when steel discharging has been completed, the lid 8 of said inspection-and-working opening 7 is opened, and tapping hole filling-agent is dropped into the tapping hole 5 to block it up.

In conjunction with the above-mentioned steel making operation, combustion aiding burners 9 as shown by two-dot chain lines in FIG. 5 have been generally used in order to reduce melting time and to save electric energy for melting. As shown in FIG. 5, the position of each of these combustion aiding burners 9 has hitherto been angularly deviated by 60 degrees from that of each of the three electrodes arranged around the center of the furnace at angular intervals of 120 degrees. Namely, each of the combustion aiding burners has been arranged on the furnace side wall 2, with its nozzle being directed to the furnace inside, such that its flame may be ejected obliquely and downwardly toward the midst of each pair of the electrodes. The reason the combustion aiding burners have been arranged in such a way is that the domains A deviated by 60 degrees from the positions of said 120 degrees spacing between the three electrodes have been inclined to generate low melting speed spots (cold spots).

However such an arrangement of the combustion aiding burners 9 in said prior art has been nothing but the burner arrangement in a concentric type EAF as intactly shifted to an EBT type EAF; in other words, it has not been based on adequate consideration of the specific construction of the EBT type EAF.

OBJECT AND SUMMARY OF THE INVENTION

It is a general object of this invention to provide a combustion-aiding-apparatus (hereunder, referred to simply as "apparatus") for a steel-making electric-arc-furnace which can overcome the aforementioned existing faults.

It is a specific object of this invention to provide an apparatus which can promote steel scraps in cold spots near a tapping hole to be melted by the use of a combustion aiding burner additionally installed on a balcony whose nozzle can be mobilized and inserted into a furnace jut portion through an inspection-and-working opening.

Thereby, it is another specific object of this invention to provide an apparatus which can fit the melting speed of said cold spots near the tapping hole to that of other spots in the furnace.

Accordingly, it is another specific object of this invention to provide an apparatus which can equalize the melting speed of the whole furnace, can shorten steel making time, and can thereby reduce electric energy consumption.

It is another specific object of this invention to provide an apparatus which can prevent both poor melted steel flow near the tapping hole and the tapping hole blockade by unmelted steel scraps from occurring.

Alike, it is another specific object of this invention to provide an apparatus which can dissolve such problems as temperature unevenness and unfavorable product-steel constituents due to unmelted steel scraps.

It is another specific object of this invention to provide an apparatus which can perform two different tasks smoothly utilizing the existing inspection-and-working opening without providing any exclusive-use in-and-out nozzle passage or the like.

Accordingly, it is another specific object of this invention to provide an apparatus which enables the existing balcony to be used unchangedly.

It is another specific object of this invention to provide an apparatus which can exclude such presumable troubles as the nozzle's blockade or water leaking occurring in the case that the burner's nozzle should be always retained inside the furnace.

It is a more specific object of this invention to provide an apparatus having a sound-and-flame-proof plate which can completely shut the inspection-and-working opening simultaneously when the burner's nozzle is inserted into the furnace jut portion; can, therefore, shut the inspection-and-working opening without addition of any other working process; and, when the burner is being used, can effectively prevent noise, flame, and dust from coming out of the furnace.

It is a still more specific object of this invention to provide an apparatus which can automatically perform the setting work process ranging from moving the lid of the inspection-and-working opening to inserting the burner's nozzle into the furnace without the need of human operation.

In order to attain the above-mentioned objects, a combustion aiding apparatus for a steel-making electric-arc-furnace of the present invention is, firstly, characterized by installing a combustion aiding burner on a balcony having an inspection-and-working opening through which tapping hole a filling-agent can be dropped and also by making the nozzle of said combustion aiding burner freely inserted into and withdrawn from a furnace through said inspection-and-working opening, in a conventional combustion aiding apparatus for a steel-making electric-arc-furnace of eccentric bottom tapping type.

In addition to said first characteristic, the combustion aiding apparatus for the steel-making electric-arc-furnace of the present invention is, secondly, characterized by that a sound-and-flame-proof plate is attached to the nozzle of said combustion aiding burner for shutting said inspection-and-working opening when said nozzle has entered the furnace through said inspection-and-working opening.

In addition to said first and second characteristics, the combustion aiding apparatus for the steel-making electric-arc-furnace of the present invention is, thirdly, characterized by that the lid of said inspection-and-working opening is automatically removed and at the same time the nozzle of said burner is inserted automatically through said inspection-and-working opening, by switching on the setting switch for said combustion aiding burner.

The above-mentioned three characteristics of the present invention yield various effects as the following.

By virtue of the first characteristic; the combustion aiding burner additionally installed on the balcony can, at need, insert the nozzle of said combustion aiding burner through the inspection-and-working opening and make it eject a flame; thereby, promoting the melting of steel scraps at the furnace jut portion (the domain B shown in FIG. 2) so as to catch up with the melting of steel scraps in other furnace inside portions; as a result, uniform melting in the whole furnace can be realized; thereby, steel making time and electric energy consumption.

In a conventional EAF's jut portion, the unmelted steel scraps have been inclined either to obstruct melted steel flow or to clog up the tapping hole to disable the tapping, and such existing faults can be overcome by the present invention.

Another fault in the conventional EAF that the unmelted steel scraps in the furnace jut portion may drop into the melted steel just ahead of its being tapped to cause temperature unevenness and inferior steel constituents can also be dissolved by the present invention.

Further, the inspection-and-working opening provided for the purpose of dropping filling-agent into the tapping hole can be also unchangedly and used as a burner nozzle insertion hole, so that there is no need for a new hole for the exclusive use of the burner nozzle to be provided individually, and the existing balcony can be utilized unchangedly. Needless to say, said tapping hole filling-agent dropping operation can be performed smoothly by removing the burner nozzle as required. The nozzle is inserted in the furnace at need and is withdrawn from the furnace when it is unused, so that the incident due to the nozzle's being blocked or due to the leaking of the nozzle's cooling water into the furnace can be prevented.

By virtue of the second characteristic; when the nozzle of the combustion aiding burner is inserted in the furnace through the inspection-and-working opening, the sound-and-flame-proof plate attached to the nozzle shuts said opening; so that, said plate serves the purpose of a lid, and can automatically prevent the noise, flame, and dust from coming out of the furnace while the combustion aiding burner is being used.

By virtue of the third characteristic, the work process ranging from removing the lid of the inspection-and-working opening to setting the combustion aiding burner's nozzle to said opening can be automatically performed, so that there is no need of human operation.

DESCRIPTION OF THE PREFERRED EMBODIMENT

Figure 1:
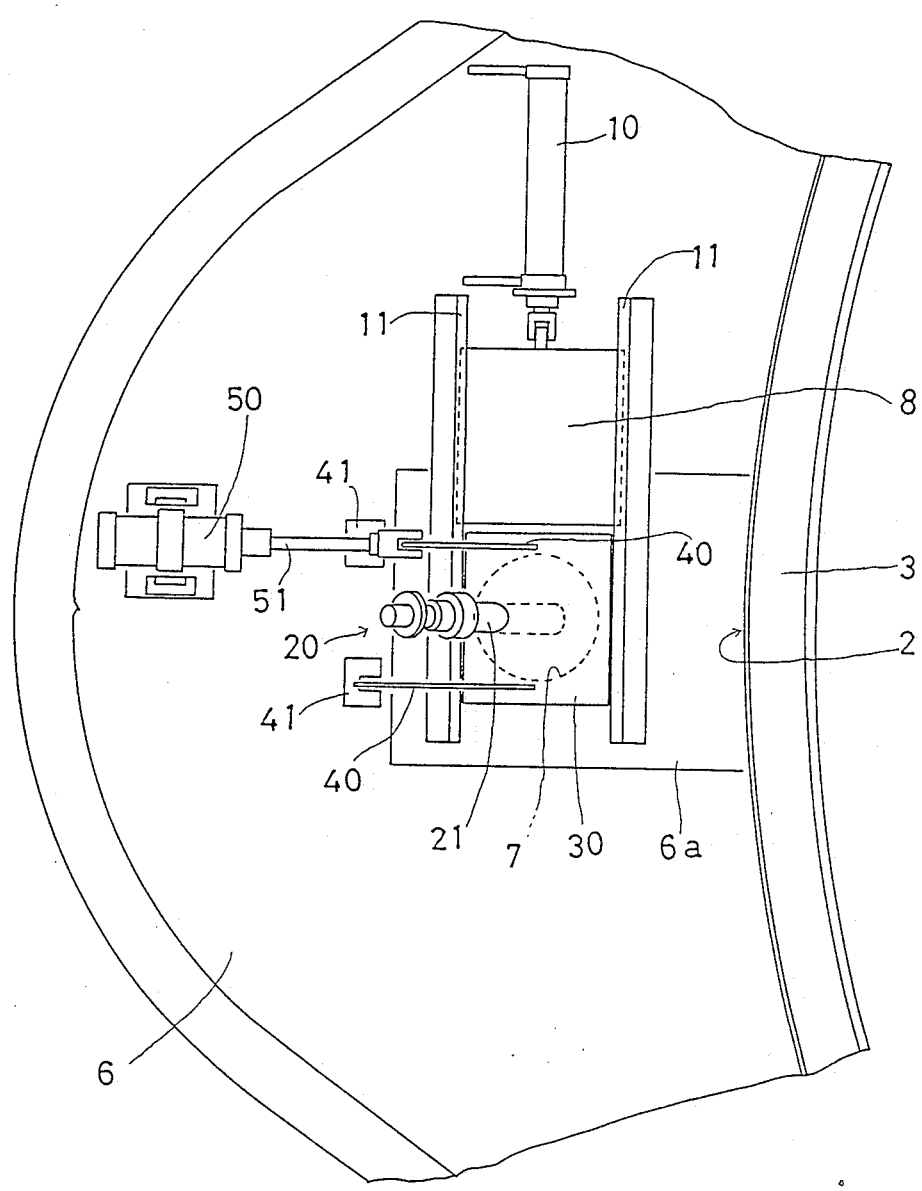
FIG. 1 is a plan view of a combustion aiding apparatus installed on a balcony of a steel-making electric-arc-furnace of eccentric bottom tapping type.
Figure 2:
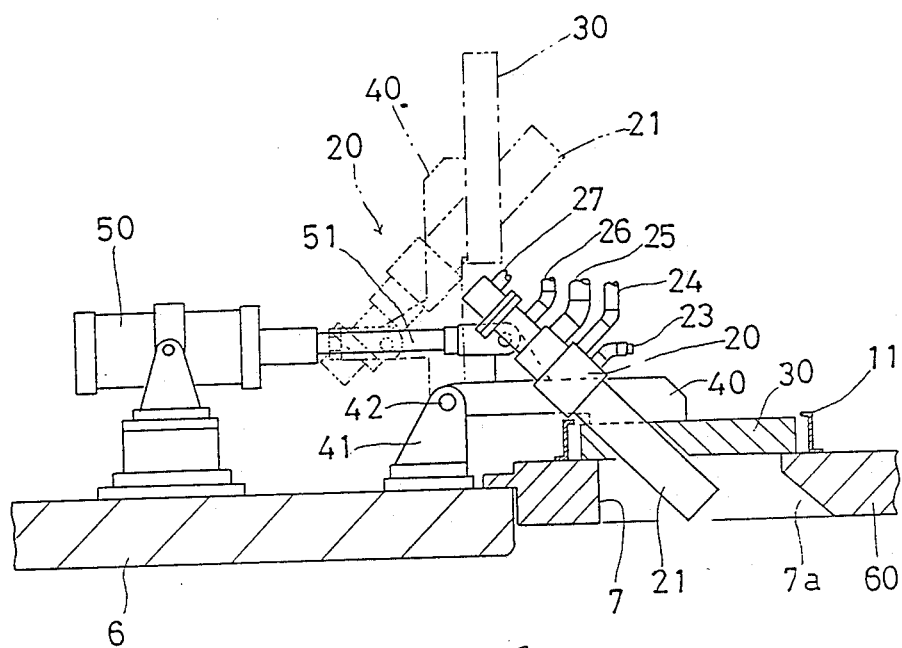
FIG. 2 is a side elevational view of the same combustion aiding apparatus.
Figure 3:
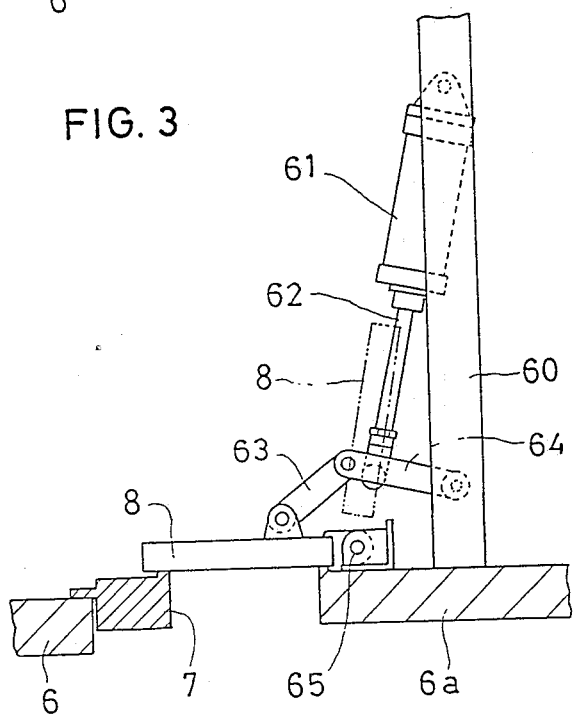
FIG. 3 is a side elevational view showing another example of the mechanism for removing a lid of an inspection-and-working opening.
Figure 4:
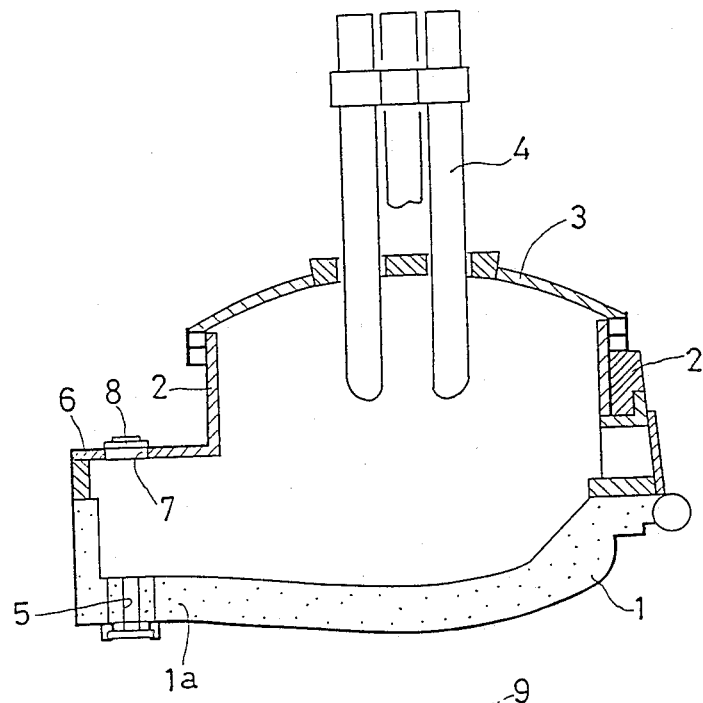
FIG. 4 is a longitudinal sectional view showing the generic configuration of the steel-making electric-arc-furnace of eccentric bottom tapping type.

FIG. 1 is a plan view of a combustion aiding apparatus installed on a balcony of a steel-making electric-arc-furnace of eccentric bottom tapping type, FIG. 2 is a side elevational view of the same combustion aiding apparatus, and FIG. 3 is a side elevational view showing another example of the mechanism for removing a lid of an inspection-and-working opening.

As shown in FIG. 1 and FIG. 2, an inspection-and-working opening 7 is formed at the portion 6a of a balcony 6. A lid 8 of this inspection-and-working opening 7 is enabled to take either an advanced position to shut the said opening 7 or a retired position by being made to slide with a lid-moving cylinder 10 along a guide 11. In the figures, the lid 8 is in the removed position.

On the other hand, attaching of a combustion aiding burner 20 is done in such a way : firstly, a nozzle 21 of the burner 20 and a sound-and-flame-proof plate 30 are united in a body, with the nozzle 21 penetrating the plate 30; secondly, one end of levers 40, 40 are respectively fixed to the plate 30; thirdly, the other end of the levers 40, 40 are respectively linked to supporting parts 41, 41 (which are fixed to the surface of the balcony 6) with pins 42. Further, to said lever 40, a piston 51 of a cylinder 50 for the purpose of moving the combustion aiding burner is linked; then, by advancing and retracting the piston 51, said levers 40, 40 are made to rotate around said pins 42. In keeping with the rotation of the levers 40, 40, said nozzle 21 and sound-and-flame-proof plate 30 are also made to rotate; thereby, the nozzle 21 can freely take either an inserted or a removed position through the inspection-and-working opening 7. FIG. 1 and FIG. 2 show the situation in which the nozzle 21 is taking the inserted position through the inspection-and-working opening 7. And the two-dot chain lines in FIG. 2 show the situation in which the nozzle 21 and the sound-and-flame-proof plate 30 is taking the removed position through the opening 7. The nozzle 21, at its inserted position into the inspection-and-working opening, directs its flame ejecting direction, obliquely and downwardly, toward the furnace center. To meet the need for this, the opening 7 is partly cut (at the part 7a) so that the flame may be ejected without hindrance. Further, when the nozzle 21 takes the inserted position, said sound-and-flame-proof plate 30 takes the position to shut the inspection-and-working opening 7. As the plate 30 thus automatically shuts the opening 7 in place of the lid 8, it becomes possible to effectively prevent noise, splash, flame and dust from coming out of the furnace. The said combustion aiding burner as well as the plate 30 are of water-cooled type, and the numbers 23, 24 denote water pipes. The flame ejection with the combustion aiding burner 20 can be done by means of either oil burning or gas burning. In case of oil burning, the burner 20 is equipped with such pipes as an oil bringing-in pipe 26, an air bringing-in pipe 27 for atomizing, an oxygen bringing-in pipe 25 and the like.

Figure 5:
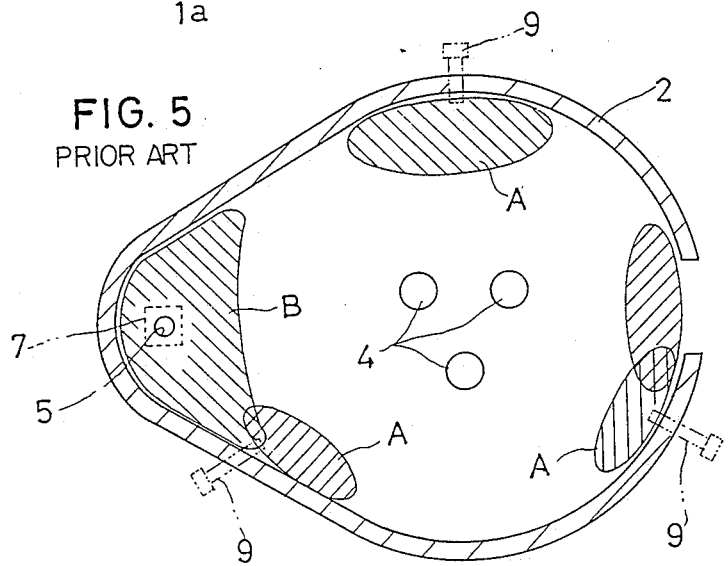
FIG. 5 is a schematic horizontal sectional view of the steel-making electric-arc-furnace of eccentric bottom tapping type showing the arrangement of conventional combustion aiding burners.

The combustion aiding apparatus of this invention is also equipped with a setting switch for the combustion aiding burner 20, though it is not shown in the figures. And by switching on this setting switch, the lid 8 is retired and then the nozzle 21 is inserted in the furnace. That is to say; first, when the setting switch is switched on, the cylinder 10 operates and slides the lid 8 from the position just above the inspection-and-working opening to the removed position along the guide 11; in the next place, the other cylinder 50 operates and advances its piston 51, and thereby, the levers 40, 40 rotate clockwise (in FIG. 2), and thereby, the nozzle 21 rotates from the two-dot chain line position to full line position (in FIG. 2) and enters the furnace through the inspection-and-working opening 7. At that time, the sound-and-flame-proof plate 30 shuts the opening 7, thereby completing to prepare for the flame ejection. The flame ejection with this combustion aiding burner 20 can be performed either synchronously with those of the burners 9 located on the side wall of the furnace in hitherto conventionally adopted way (as shown in FIG. 5) or independently of the burners 9. When such a combustion aiding has been completed; first, said setting switch is switched off, and thereby, the nozzle 21 together with the sound-and-flame-proof plate 30 rotate from the inserted position to the two-dot chain line position as shown in FIG. 2, and rest; in the next place, the lid 8 advances from the removed position as shown in FIG. 2 along the guide 11 and shuts the inspection-and-working opening 7. It is also allowable to install a switch for advancing and removing the lid 8 and a switch for inserting and withdrawing the nozzle 21 individually and to operate these switches separately. Naturally, when applying filling-agent to the tapping hole at such a time when steel melting and melted steel discharging have been completed, the lid 8 has only to be removed.

FIG. 3 is a side elevational view showing another example of the mechanism for removing a lid 8 of an inspection-and-working opening 7. In this example; a cylinder 61, its piston 62, and links 63 and 64 are attached to a prop 60 set up on a balcony 6; thereby, a lid 8 is enabled to rotate around a main axis 65 to open the opening 7, and to be removed to a two-dot chain line position.

What is claimed is:

1. An improved steel making electric-arc-furnace of an eccentric bottom taping type including a furnace bed (1), a furnace side wall (2), a top cover through which heating electrodes extend into said furnace, a plurality of spaced heat aiding burners (9) spaced relative to said heating electrodes, a tapping hole section in said furnace bed, a balcony (6) extending from said furnace side wall (2), an inspection-and-working opening (7) in said balcony and a movable lid (8) for movement relative to said balcony for opening and closing said inspection-and-working opening; the improvement in which said balcony is provided with a combustion burning (20) having a burner nozzle (21) secured such that said burner nozzle is freely insertable into and withdrawn from said furnace through said opening (7) in said balcony (6).

2. An improved steel-making electric-arc-furnace in accordance with claim 1, which includes a sound-and-flame proof plate (30) secured to said burner nozzle (21) relative to said inspection-and-working opening (7), said plate (30) is secured to burner nozzle (21) for closing said opening (7) when said burner nozzle (21) is in an inserted position in said opening (7), and said plate (30) is in a position to open said opening (7) when said nozzle burner is withdrawn from said opening (7).

3. An improved electric-arc-furnace in accordance with claim 2, which includes operative means secured to said plate (30) for automatically closing and opening said inspection-and-working opening and automatically inserting said burner into and removing said burner from said furnace through said inspection-and-working opening, said operative means being actuated by switching on a setting switch.

* * * * *